(12) United States Patent
Doi (10) Patent No.: US 10,795,967 B2
(45) Date of Patent: *Oct. 6, 2020

(54) MULTIPLE PRECISION INTEGER MULTIPLIER BY MATRIX-MATRIX MULTIPLICATIONS USING 16-BIT FLOATING POINT MULTIPLIER

(71) Applicant: INTERNATIONAL BUSINESS MACHINES CORPORATION, Armonk, NY (US)

(72) Inventor: Jun Doi, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,246

(22) Filed: Nov. 7, 2019

(65) Prior Publication Data
US 2020/0073914 A1 Mar. 5, 2020

Related U.S. Application Data

(63) Continuation of application No. 15/911,772, filed on Mar. 5, 2018.

(51) Int. Cl.
G06F 17/16 (2006.01)
G06F 7/544 (2006.01)
G06F 7/53 (2006.01)

(52) U.S. Cl.
CPC ............ *G06F 17/16* (2013.01); *G06F 7/5324* (2013.01); *G06F 7/5443* (2013.01)

(58) Field of Classification Search
CPC ................................ G06F 17/16; G06F 7/5443
(Continued)

(56) References Cited

U.S. PATENT DOCUMENTS

2012/0215826 A1 8/2012 Hansen et al.

FOREIGN PATENT DOCUMENTS

| CN | 102446460 A | 5/2012 |
|---|---|---|
| EP | 3200068 A1 | 2/2017 |
| WO | 2013044276 A1 | 4/2013 |

OTHER PUBLICATIONS

List of IBM Patents or Patent Applications Treated as Related dated Nov. 7, 2019, 2 pages.

(Continued)

*Primary Examiner* — Tan V Mai
(74) *Attorney, Agent, or Firm* — Tutunjian & Bitetto, P.C.; Vazken Alexanian (57) ABSTRACT

A computer-implemented method, computer program product, and apparatus are provided. The method includes substituting N×N first integer elements, among a plurality of first integer elements obtained by dividing first integer data expressing a first integer in a first digit direction, into a first matrix having N rows and N columns. The method further includes substituting each of one or more second integer elements, among a plurality of second integer elements obtained by dividing second integer data expressing a second integer in a second digit direction, into at least one matrix element of a second matrix having N rows and N columns. The method also includes calculating a third matrix that is a product of the first matrix and the second matrix. The method includes outputting each matrix element of the third matrix as a partial product in a calculation of a product of the first integer and the second integer.

25 Claims, 6 Drawing Sheets

(58) Field of Classification Search
USPC .................................... 708/620, 625, 607
See application file for complete search history.

(56) References Cited

OTHER PUBLICATIONS

Kouya, "Tuning Technique for Multiple Precision Dense Matrix Multiplication using Prediction of Computational Time", arXiv:1710.01839, Oct. 2017, pp. 1-8.
International Search Report issued in PCTIB2019051710 dated Jun. 18, 2019, 9 pages.

FIRST INTEGER DATA(B) | $b_7$ | $b_6$ | $b_5$ | $b_4$ | $b_3$ | $b_2$ | $b_1$ | $b_0$ |

×

SECOND INTEGER DATA(A) | $a_7$ | $a_6$ | $a_5$ | $a_4$ | $a_3$ | $a_2$ | $a_1$ | $a_0$ |

*FIG. 5*

$$\text{FIRST MATRIX} \underbrace{\begin{pmatrix} b_7 & b_6 & b_4 \\ & b_5 & \end{pmatrix}}_{} \times \underbrace{\begin{pmatrix} a_7 \end{pmatrix} \begin{pmatrix} a_6 & a_5 \\ a_7 & a_6 \end{pmatrix} \begin{pmatrix} a_4 & a_3 \\ a_5 & a_4 \end{pmatrix} \begin{pmatrix} a_2 & a_1 \\ a_3 & a_2 \end{pmatrix} \begin{pmatrix} a_0 \\ a_1 \end{pmatrix}}_{\text{SECOND MATRIX}} \quad M2_1$$

$$\underbrace{\begin{pmatrix} b_3 & b_2 & b_0 \\ & b_1 & \end{pmatrix}}_{M1} \times \begin{pmatrix} a_7 \end{pmatrix} \begin{pmatrix} a_6 & a_5 \\ a_7 & a_6 \end{pmatrix} \begin{pmatrix} a_4 & a_3 \\ a_5 & a_4 \end{pmatrix} \begin{pmatrix} a_2 & a_1 \\ a_3 & a_2 \end{pmatrix} \begin{pmatrix} a_0 \\ a_1 \end{pmatrix} \quad M2_2$$

MULTIPLE PRECISION INTEGER MULTIPLIER BY MATRIX-MATRIX MULTIPLICATIONS USING 16-BIT FLOATING POINT MULTIPLIER

BACKGROUND

The present invention relates to multiplication and more particularly to multiple precision integer multiplier by matrix-matrix multiplication using 16-bit floating point multiplier.

A conventional method has been proposed for multiplying integers using a matrix operation. However, in recent years, there has been a demand for multiplication to be performed more quickly and with higher precision.

SUMMARY

According to a first aspect of the present invention, provided is a computer-implemented method comprising substituting N×N first integer elements, among a plurality of first integer elements obtained by dividing first integer data expressing a first integer in a digit direction, into a first matrix having N rows and N columns; substituting each of one or more second integer elements, among a plurality of second integer elements obtained by dividing second integer data expressing a second integer in a digit direction, into at least one matrix element of a second matrix having N rows and N columns; calculating a third matrix that is a product of the first matrix and the second matrix; and outputting each matrix element of the third matrix as a partial product in a calculation of a product of a first integer and the second integer. In this way, it is possible to increase the calculation precision and calculation speed.

During the substituting into the first matrix and the substituting into the second matrix, each matrix element of the first matrix and the second matrix may be arranged such that each product corresponding to the same digit position in the product of the first integer and the second integer, among the product of each first integer element included in the first matrix and each second integer element included in the second matrix, corresponds to the same matrix element of the third matrix. In this way, it is possible to align the calculated partial products, and therefore it is possible to calculate the correct multiplication result.

According to another aspect of the present invention, provided is an apparatus comprising a processor or programmable circuitry; and one or more computer readable mediums collectively including instructions that, when executed by the processor or the programmable circuitry, cause the processor or the programmable circuitry to: substitute N×N first integer elements, among a plurality of first integer elements obtained by dividing first integer data expressing a first integer in a digit direction, into a first matrix having N rows and N columns; substitute each of one or more second integer elements, among a plurality of second integer elements obtained by dividing second integer data expressing a second integer in a digit direction, into at least one matrix element of a second matrix having N rows and N columns; calculate a third matrix that is a product of the first matrix and the second matrix; and output each matrix element of the third matrix as a partial product in a calculation of a product of the first integer and the second integer. In this way, it is possible to increase the calculation precision and calculation speed.

According to yet another aspect of the present invention, provided is an apparatus comprising a first matrix substituting section that substitutes N×N first integer elements, among a plurality of first integer elements obtained by dividing first integer data expressing a first integer in a digit direction, into a first matrix having N rows and N columns; a second matrix substituting section that substitutes each of one or more second integer elements, among a plurality of second integer elements obtained by dividing second integer data expressing a second integer in a digit direction, into at least one matrix element of a second matrix having N rows and N columns; a third matrix calculating section that calculates a third matrix that is a product of the first matrix and the second matrix; and a partial product output section that outputs each matrix element of the third matrix as a partial product in a calculation of a product of the first integer and the second integer. In this way, it is possible to increase the calculation precision and calculation speed.

According to yet another aspect of the present invention, provided is a computer program product including one or more computer readable storage mediums collectively storing program instructions that are executable by a processor or programmable circuitry to cause the processor or the programmable circuitry to perform operations comprising: substituting N×N first integer elements, among a plurality of first integer elements obtained by dividing first integer data expressing a first integer in a digit direction, into a first matrix having N rows and N columns; substituting each of one or more second integer elements, among a plurality of second integer elements obtained by dividing second integer data expressing a second integer in a digit direction, into at least one matrix element of a second matrix having N rows and N columns; calculating a third matrix that is a product of the first matrix and the second matrix; and outputting each matrix element of the third matrix as a partial product in a calculation of a product of the first integer and the second integer. In this way, it is possible to increase the calculation precision and calculation speed.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Hereinafter, some embodiments of the present invention will be described. The embodiments do not limit the invention according to the claims, and all the combinations of the features described in the embodiments are not necessarily essential to means provided by aspects of the invention.

Figure 1:
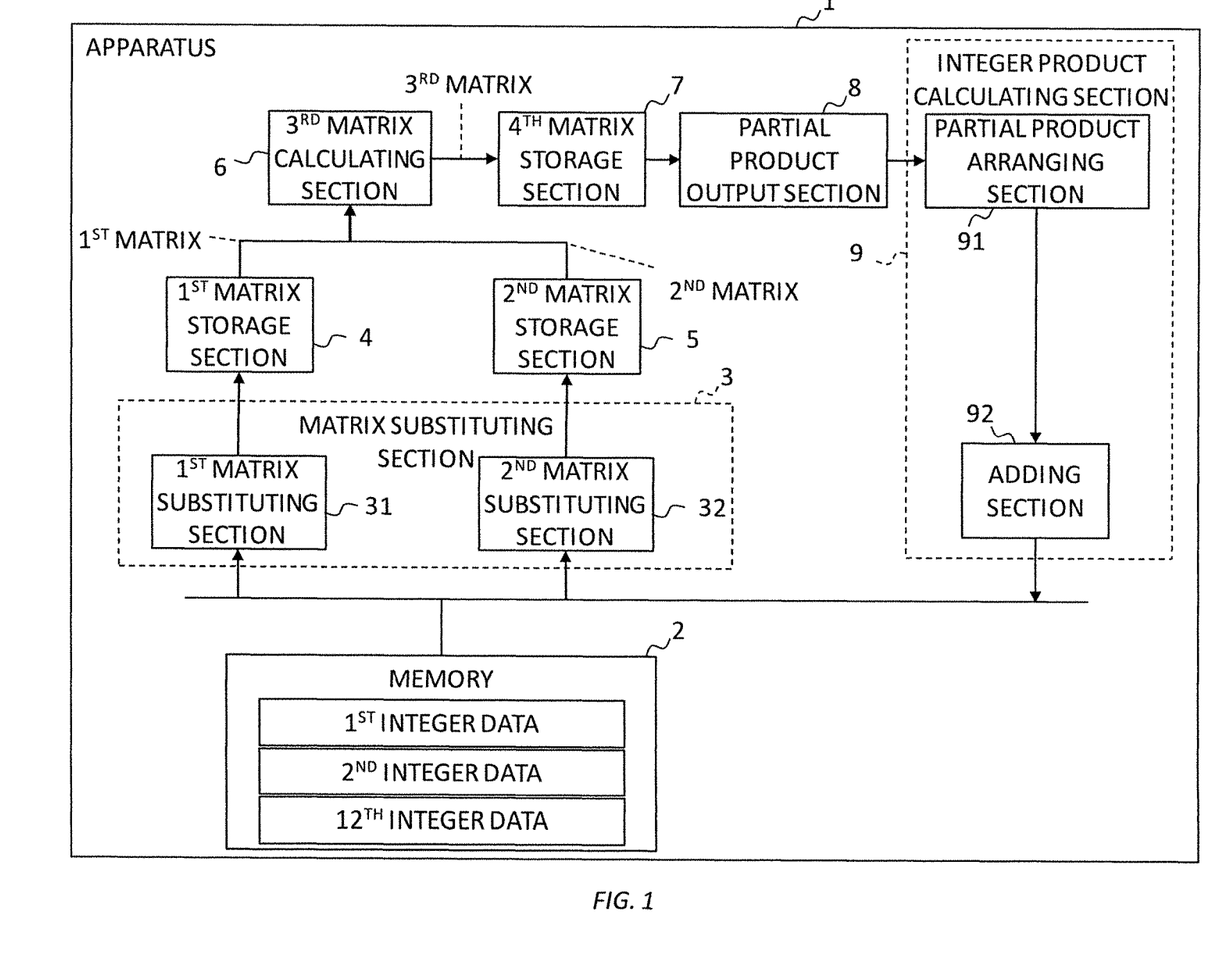
FIG. 1 shows an apparatus according to an exemplary embodiment.

FIG. 1 shows an apparatus 1 according to the present embodiment. The apparatus 1 outputs the product of two integers by performing a matrix operation, and performs numerical computation such as Computer Aided Design (CAD), Computer Aided Engineering (CAE), a financial simulation, and/or encryption, for example. The apparatus 1 includes a memory 2, a matrix substituting section 3, a first matrix storage section 4, a second matrix storage section 5, a third matrix calculating section 6, a fourth matrix storage section 7, a partial product output section 8, and an integer product calculating section 9. The apparatus 1 may be a processor, and may be a Graphical Processor Unit (GPU), for example.

The memory 2 stores at least one piece of integer data expressing an integer that is a target of a multiplication operation. For example, the memory 2 may store first integer data expressing a first integer and second integer data expression a second integer.

The memory 2 may store at least one piece of integer data representing a multiplication result. For example, the memory 2 may store twelfth integer data expressing a twelfth integer that is a product of the first integer and the second integer.

Here, the first integer and the second integer may be the same value as each other, or may be different values. The first integer and the second integer may be expressed in an integer format, or may be expressed by the mantissa portion in a floating-point format and associated with the exponent portion. The first integer data, the second integer data, and the twelfth integer data are binary data, as an example in the present embodiment, and have an arbitrary length such as 8 bits, 16 bits, 32 bits, or 64 bits.

The matrix substituting section 3 generates one or more integer elements by dividing the integer data read from the memory 2 in the digit direction, and substitutes these integer elements into a matrix. The integer elements may each have one or more digits. Dividing the integer data in the digit direction may mean dividing the integer data into one or more base digits in a descending order or ascending order in the digit direction. The matrix substituting section 3 includes a first matrix substituting section 31 and a second matrix substituting section 32.

The first matrix substituting section 31 substitutes N×N first integer elements, among the plurality of first integer elements obtained by dividing the first integer data expressing the first integer in the digit direction, into the first matrix storage section 4. As an example in the present embodiment, N is 2, but may instead be another number, e.g., 16. The second matrix substituting section 32 substitutes each of one or more second integer elements, among the plurality of second integer elements obtained by dividing the second integer data expressing the second integer in the digit direction, into at least one matrix element of the second matrix storage section 5 having N rows and N columns. For example, the second matrix substituting section 32 may substitute one to four second integer elements into the second matrix storage section 5 having two rows and two columns. Each second integer element may be the same size as each first integer element, and may be 8 bits, for example.

The first matrix storage section 4 and the second matrix storage section 5 store a first matrix and a second matrix that each have N rows and N columns (e.g. two rows and two columns). The first matrix storage section 4 and the second matrix storage section 5 may include registers with matrix arrangements. The registers of the first matrix storage section 4 and the second matrix storage section 5 may store data of the same size.

The third matrix calculating section 6 calculates a third matrix, by multiplying together the first matrix and the second matrix. If the apparatus 1 is a processor, the calculation of the third matrix may be performed according to one command. The third matrix calculating section 6 may supply the third matrix to the fourth matrix storage section 7.

The fourth matrix storage section 7 stores a fourth matrix obtained by integrating the third matrix. The fourth matrix may be a matrix obtained by adding each matrix element of the third matrix to the sum of the calculated partial products corresponding to the same digit positions, every time the third matrix is calculated. The fourth matrix storage section 7 may include a register with a matrix arrangement. The register of the fourth matrix storage section 7 may store data with a larger size than the data stored in the first matrix storage section 4 and the second matrix storage section 5.

The partial product output section 8 outputs each matrix element of the third matrix, as a partial product in the calculation of the product of the first integer and the second integer. As an example in the present embodiment, the partial product output section 8 may extract each matrix element of the fourth matrix obtained by integrating the third matrix, as the sum of the partial products of the first integer elements and the second integer elements for corresponding digit positions in the calculation of the product of the first integer and the second integer. The partial product output section 8 may supply each extracted matrix element to the integer product calculating section 9.

The integer product calculating section 9 calculates the product of the first integer and the second integer. The integer product calculating section 9 may include a partial product arranging section 91 and an adding section 92.

The partial product arranging section 91 arranges each partial product at a corresponding digit position, in order to obtain the multiplication result from the sum of the partial products. For example, the partial product arranging section 91 arranges each partial product supplied from the partial product output section 8 (e.g. the sum of the partial products in the present embodiment) at a digit position corresponding to this partial product within the product of the first integer and the second integer.

The adding section 92 obtains the twelfth integer as the multiplication result acquired by calculating the sum of each partial product. The adding section 92 may store the twelfth integer in the memory 2.

With the apparatus 1 described above, the third matrix, which is the product of the first matrix and the second matrix, is calculated and each matrix element of the third matrix is output as a partial product in the calculation of the product of the first integer and the second integer, and therefore it is possible to perform multiplication by calculating the partial products. Accordingly, since it is possible to perform multiplication while subdividing the calculation, it is possible to reduce the calculation error caused by information dropping or the like and to increase the calculation precision, by calculating the partial products while allowing a margin for the number of calculation digits. Furthermore, since the multiplication is performed according to a matrix calculation, it is possible to increase the calculation speed.

Figure 2:
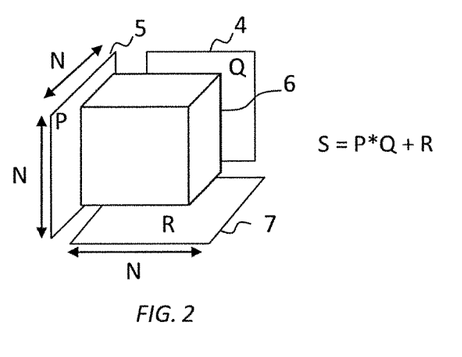
FIG. 2 shows the third matrix calculating section.

FIG. 2 shows the first matrix storage section 4, the second matrix storage section 5, the third matrix calculating section 6, and the fourth matrix storage section 7. As an example in the present embodiment, the third matrix calculating section 6 is a tensor calculation unit, and may calculate a third matrix PQ from a first matrix P and a second matrix Q each having N rows and N columns (e.g. two rows and two columns) stored in the first matrix storage section 4 and the second matrix storage section 5. Furthermore, the third matrix calculating section 6 may calculate a new fourth matrix S by adding together the newly calculated third matrix PQ and a fourth matrix R, which is the sum of the third calculated matrix PQ, of the fourth matrix storage section 7 according to the operation S=P*Q+R, and update the fourth matrix R of the fourth matrix storage section 7.

Figure 3:
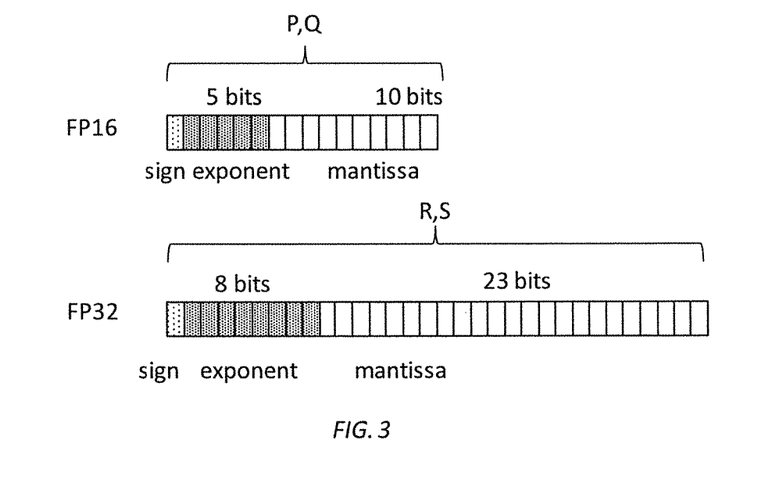
FIG. 3 shows a register storing matrix elements.

FIG. 3 shows a register storing matrix elements. As an example in the present embodiment, the register storing the matrix elements of the first matrix P and the second matrix Q may store each matrix element in a half-precision floating-point format (FP16) having a 1-bit sign portion, a 5-bit exponent portion, and a 10-bit mantissa portion. The register storing the matrix elements of the fourth matrices R and S may store each matrix element in a single-precision floating-point format (FP32) having a 1-bit sign portion, an 8-bit exponent portion, and a 23-bit mantissa portion. As an example, each integer element may be stored in the mantissa portion of the register, or may be stored in the mantissa portion and sign portion of the register.

Figure 4:
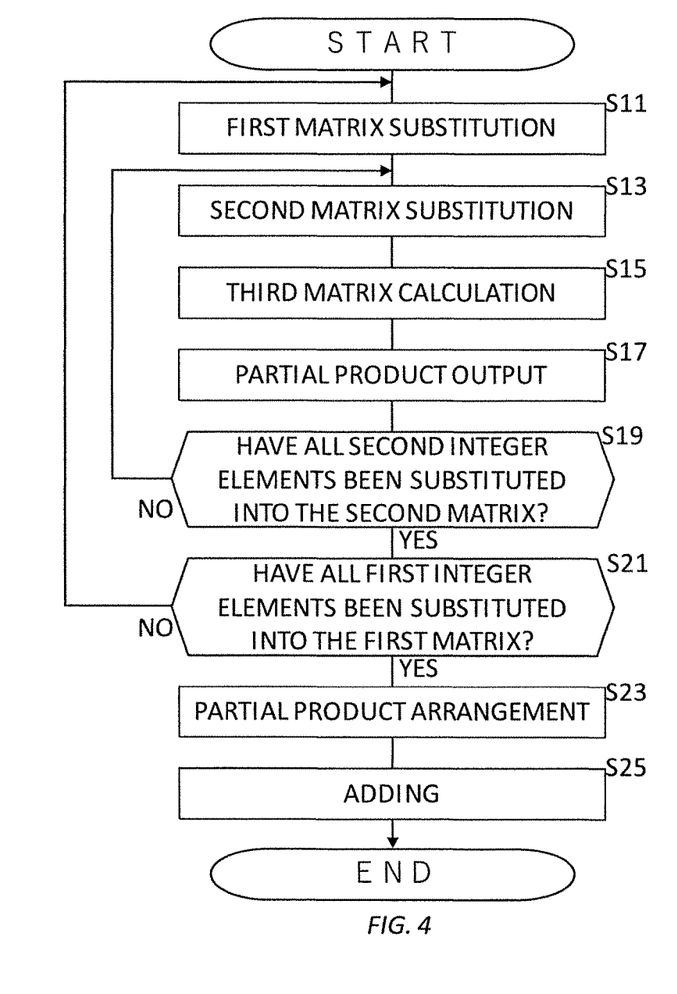
FIG. 4 shows an operation of the apparatus according to an exemplary embodiment.

FIG. 4 shows an operation of the apparatus 1 according to the present embodiment. By performing the processes of steps S11 to S25, the apparatus 1 multiplies the first integer by the second integer to calculate the twelfth integer as the product. The apparatus 1 may begin operating when the first integer and the second integer are designated by an operator and multiplication instructions are input. When operation starts, the fourth matrix in the fourth matrix storage section 7 may be reset to 0.

First, at step S11, the first matrix substituting section 31 substitutes N×N (e.g. 4) first integer elements, among the plurality of first integer elements obtained by dividing the first integer data in the digit direction, into the first matrix in the first matrix storage section 4. Next, at step S13, the second matrix substituting section 32 substitutes each of the one or more second integer elements, among the plurality of second integer elements obtained by dividing the second integer data in the digit direction, into at least one matrix element of the second matrix in the second matrix storage section 5.

When performing the substitution into the first matrix, the first matrix substituting section 31 may generate a plurality of first integer elements by reading the first integer data from the memory 2 and dividing this first integer data in the digit direction. As an example, the first matrix substituting section 31 may generate the plurality of first integer elements by dividing the first integer data into units of 8 digits, i.e. 8 bits.

Similarly, when performing the substitution into the second matrix, the second matrix substituting section 32 may generate a plurality of second integer elements by reading the second integer data from the memory 2 and dividing this second integer data in the digit direction. As an example, the second matrix substituting section 32 may generate the plurality of second integer elements by dividing the second integer data into units of 8 digits, i.e. 8 bits.

The first matrix substituting section 31 and the second matrix substituting section 32 may substitute each matrix element of the first matrix and the second matrix into the first matrix and the second matrix, such that products corresponding to the same digit positions in the twelfth integer, among the plurality of products of each first integer element included in the first matrix and each second integer element included in the second matrix, are arranged corresponding to the same matrix element of the third matrix. In this way, it is possible to align the digits of the calculated partial products, and therefore it is possible to calculate the correct multiplication result.

For example, the first matrix substituting section 31 may substitute N×N first integer elements that are continuous in the digit direction in the first integer data into the first matrix. Instead of or in addition to this, the second matrix substituting section 32 may substitute one or more second integer elements that are continuous in the digit direction in the second integer data into the second matrix. In this way, it is possible to simplify the substitution of the integer elements into the first matrix and the second matrix.

Furthermore, when performing the substitution into the first matrix, the first matrix substituting section 31 may substitute N (e.g. 2) continuous first integer elements among the N×N (e.g. 4) first integer elements into each row of the first matrix. The order of substitution may be the ascending order or the descending order in the digit direction in the first integer data. When performing the substitution into the second matrix, the second matrix substituting section 32 may substitute N (e.g. 2) continuous second integer elements among the plurality of second integer elements into each column of the second matrix. The order of substitution may be the opposite of the substitution order of the N first integer elements for the first matrix, in the digit direction of the second integer data. If time order of storing integer elements is the same as time order of reading them, that is, integer elements are read from lower side, the first matrix substituting section 31 may substitute the first integer elements, such that they are arranged in reverse order of the time order of reading, for each row of the first matrix, and the second matrix substituting section 32 may substitute the second integer elements, such that they are arranged in the time order of reading, for each column of the second matrix. If the first integer data and the second integer data are stored in a little endian format, i.e. if less significant bits are positioned lower, the first matrix substituting section 31 may substitute the first integer elements in the descending order in the digit direction for each row of the first matrix, and the second matrix substituting section 32 may substitute the second integer elements in the ascending order in the digit direction for each column of the second matrix. If the first integer data and the second integer data are stored in a big endian format, i.e. if less significant bits are positioned higher, the first matrix substituting section 31 and the second matrix substituting section 32 may each substitute the integer elements in the opposite order.

Furthermore, when performing the substitution into the first matrix, the first matrix substituting section 31 may substitute N×N (e.g. 4) first integer elements into each matrix element of the first matrix in column-major order. When performing the substitution into the second matrix, the second matrix substituting section 32 may substitute N (e.g. 2) continuous second integer elements into the first row of the second matrix in the same order as the substitution order of the first integer elements in the first matrix (i.e. the ascending order or descending order in the digit direction). Furthermore, the second matrix substituting section 32 may substitute the N second integer elements into the second and following rows of the second matrix while shifting the N second integer elements in the second integer data one integer element at a time. For example, the second matrix substituting section 32 may shift the second integer elements such that the substitution order of the second integer elements in each column of the second matrix is the opposite of the substitution order of the first integer elements in each row of the first matrix. As an example, if the first integer data and the second integer data are stored in the little endian format, the first matrix substituting section 31 may substitute the N×N first integer elements into the first matrix in the row-major and descending order in the digit direction, and the second matrix substituting section 32 may substitute the N second integer elements (e.g. element ($a_1$), ..., element ($a_N$), where the subscript characters indicate the order of the integer elements) into the first row of the second matrix in the descending order in the digit direction (e.g. in the order of element ($a_N$), ..., element ($a_1$)). Furthermore, the second matrix substituting section 32 may substitute the N integer elements (e.g. element ($a_{N+1}$), ..., element ($a_2$)) obtained by shifting the N integer elements (e.g. element ($a_1$), ..., element ($a_N$)) in the second row toward the higher digit side by one integer element. After this, the second integer elements in each column of the second matrix are set in the ascending order, by substituting the N integer elements that have been shifted toward the higher digit side by the number of rows into each row. The second matrix substituting section 32 may substitute 0 if, as a result of the shift, an integer element to be substituted in does not exist in the second integer data.

Next, at step S15, the third matrix calculating section 6 calculates the third matrix, which is the product of the first matrix and the second matrix. As an example in the present embodiment, the third matrix calculating section 6 may add the calculated third matrix to the fourth matrix in the fourth matrix storage section 7. The fourth matrix may have N rows and N columns.

Next, at step S17, the partial product output section 8 outputs each matrix element of the third matrix as a partial product in the calculation of the product of the first integer and the second integer. As an example in the present embodiment, the third matrix is added to the fourth matrix having N rows and N columns, and therefore the partial product output section 8 may extract each matrix element in the first row or final row of the fourth matrix as the sum of the partial products at the corresponding digit positions in the product of the first integer and the second integer, and shift the remaining rows toward the extracted row by one row. For example, the partial product output section 8 may extract the final row from the fourth matrix if the first integer element is substituted into the first matrix in the descending order in the digit direction, and may extract the first row from the fourth matrix if the first integer element is substituted into the first matrix in the ascending order in the digit direction. In this way, a partial product for which there is no further partial product to be added in the product of the first integer and the second integer is extracted from the fourth matrix. The partial product output section 8 may set the 0 for each matrix element in which an empty space occurs as a result of the shift in the fourth matrix.

Next, at step S19, the second matrix substituting section 32 judges whether all of the integer elements in the second integer have been substituted into the second matrix. If the judgment result is negative (S19: NO), the second matrix substituting section 32 moves the processing to step S13, and if the judgment result if affirmative (S19: YES), the second matrix substituting section 32 moves the processing to step S21. If the processing of step S13 is to be repeated, the second matrix substituting section 32 may substitute one or more second integer elements that have yet to be substituted in, among the plurality of second integer elements obtained by dividing the second integer data in the digit direction, into the second matrix. In this way, the partial products of the N×N first integer elements substituted into the first matrix and each second integer element are calculated. The second matrix substituting section 32 may substitute 0 if an integer element to be substituted into the matrix element in a portion of the second matrix does not exist in the second integer data.

At step S21, the first matrix substituting section 31 judges whether all of the integer elements in the first integer have been substituted into the first matrix. If the judgment result is negative (S21: NO), the first matrix substituting section 31 moves the processing to step S11, and if the judgment result is affirmative (S21: YES), the first matrix substituting section 31 moves the processing to step S23. If the processing of step S11 is to be repeated, the first matrix substituting section 31 may substitute N×N first integer elements that have yet to be substituted in, among the plurality of first integer elements obtained by dividing the first integer data in the digit direction, into the first matrix. In this way, the partial products of each first integer element and each second integer element are calculated. The first matrix substituting section 31 may substitute 0 if an integer element to be substituted into the matrix element in a portion of the first matrix does not exist in the first integer data. By performing the processing of steps S11 to S21 described above, the process of sequentially substituting one or more second integer elements at a time from among the plurality of second integer elements into the second matrix is repeated every time a different set of N×N first integer elements among the plurality of first integer elements is substituted into the first matrix. Furthermore, the calculation of the third matrix and the output of the partial products are performed every time a substitution into the second matrix is performed.

At step S23, the partial product arranging section 91 arranges each partial product at a corresponding digit position in the product of the first integer and the second integer. For example, the partial product arranging section 91 may adjust the digit positions such that each partial product in the product of the first integer and the second integer is added at the corresponding digit position, and supply each partial product to the adding section 92. As an example, the partial product arranging section 91 may shift the digit position for each matrix element output at step S17, for every reference number of digits (e.g. 8 digits in the present embodiment).

Next, at step S25, the adding section 92 calculates the twelfth integer, which is the product of the first integer and the second integer, by calculating the sum of each partial product. In this way, the twelfth integer is calculated based on each output partial product. If there is a digit overflow in a partial product, the adding section 92 may add this digit overflow to a higher digit.

With the process described above, N continuous first integer elements among the N×N first integer elements are substituted into each row of the first matrix in the ascending order or descending order in the digit direction, and N continuous second integer elements among the plurality of second integer elements are substituted into each column of the second matrix in an order that is the opposite of the substitution order of the first integer elements. Accordingly, since it is possible to align the digits of the calculated partial products, it is possible to calculate the correct multiplication result.

Furthermore, since the digit overflows of the partial products are added to higher digits, it is possible to increase the calculation precision.

The following describes a detailed example of the multiplication.

Figure 5:
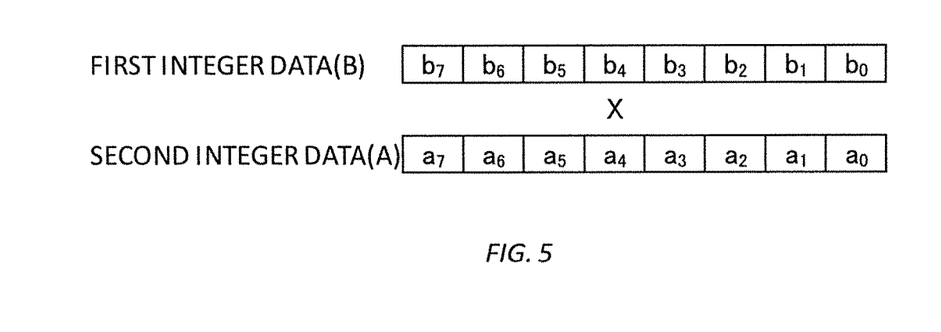
FIG. 5 shows first integer data (B) and second integer data (A).

FIG. 5 shows first integer data (B) and second integer data (A). As an example in the present embodiment, the first integer data (B) and the second integer data (A) are each 64-bit binary data. The first integer data (B) may be divided into eight first integer elements ($b_0$) to ($b_7$) that each have 8 bits. The second integer data (A) may be divided into eight second integer elements ($a_0$) to ($a_7$) that each have 8 bits. Here, the subscript characters indicate the order of the integer elements, with smaller values indicating lower digit positions.

Figure 6:
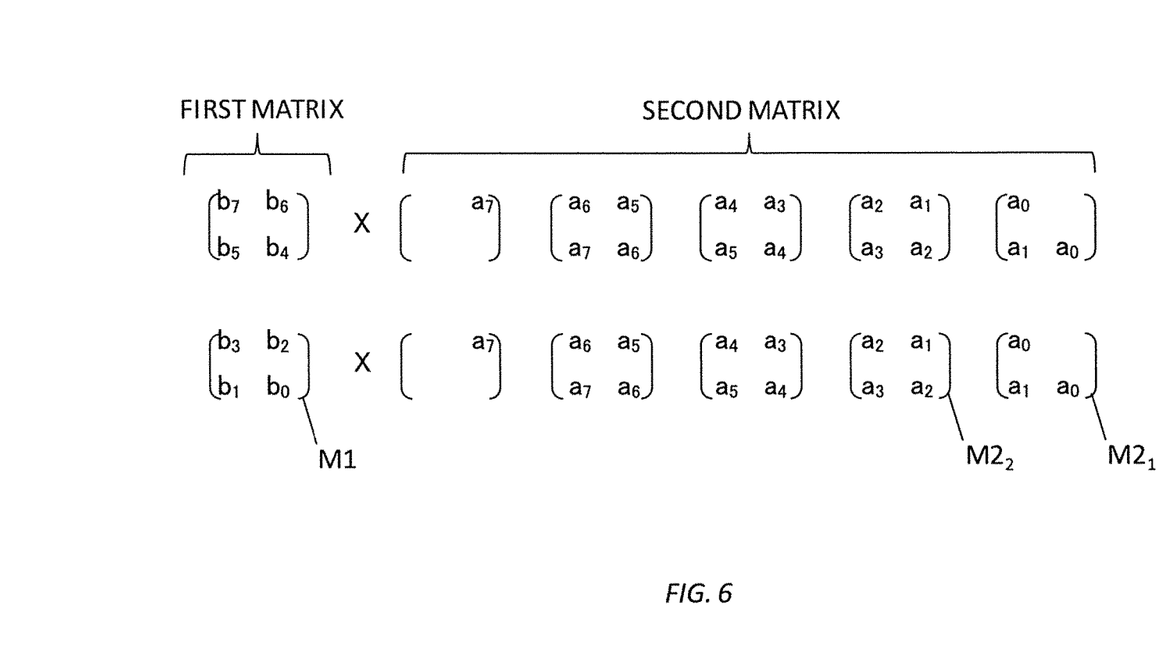
FIG. 6 shows a first matrix and a second matrix multiplied by each other.

FIG. 6 shows the first matrix and the second matrix multiplied by each other. As an example in the present embodiment, the plurality of first integer elements ($b_0$) to ($b_7$) may be substituted four at a time into the first matrix having two columns and two rows, in row-major descending order. Furthermore, one or more second integer elements may be substituted into the second matrix having two rows and two columns, such that two second integer elements are in ascending order in each column and two second integer elements are in descending order in each row. Second integer elements shifted toward a higher digit position by one integer element more than the second integer elements in the first row may be substituted into the second row of the second matrix. As long as the integer elements are lined up in the row direction and/or column direction in an order such as described above, the first matrix and the second matrix may be generated such that the matrix including integer elements at lower digit positions is generated first. In other words, the first matrix may be generated in order from the bottom of FIG. 6, and the second matrix may be generated in order from the right side of FIG. 6.

Figure 7:
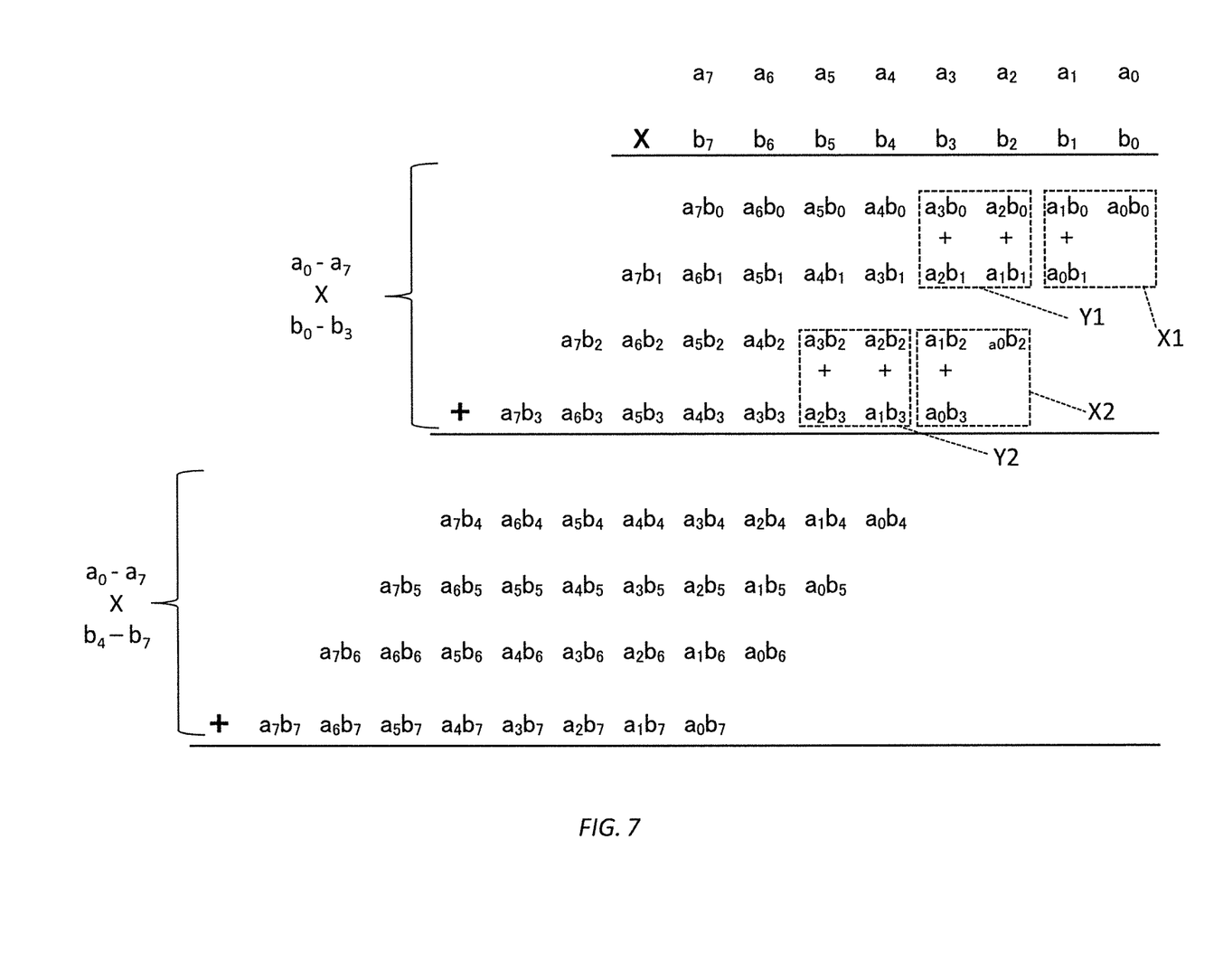
FIG. 7 shows an addition of partial products.

FIG. 7 shows the addition of partial products. In the drawing, the portions X1 and X2 surrounded by dashed lines indicate the multiplication result of the first matrix M1 and the second matrix $M2_1$ shown in FIG. 6. In these portions, the matrix element of the portion X1 is a matrix element in the final row in the third matrix, and therefore also in the fourth matrix, and is therefore extracted as the sum of the partial products at the corresponding digit positions. After the extraction, the matrix element of the portion X2 is shifted to the final row in the fourth matrix.

The portions Y1 and Y2 surrounded by dashed lines indicate the multiplication result of the first matrix M1 and the second matrix $M2_2$ shown in FIG. 6. In these portions, the matrix element of the portion Y1 is a matrix element in the final row in the third matrix and, after this matrix element is added to the matrix element in the final row in the fourth matrix (which is the matrix element of the portion X2 here), the result is extracted as the sum of the partial products at the corresponding bit positions.

After this, in the same manner, the partial products of the first integer elements $b_0$ to $b_3$ and the second integer elements $a_0$ to $a_7$ are calculated and, furthermore, the partial products of the first integer elements $b_4$ to $b_7$ and the second integer elements $a_0$ to $a_7$ are calculated. Then, by arranging each partial product at the corresponding digit position and adding the partial products together, the twelfth integer is calculated as the product.

In the present embodiment above, the apparatus 1 is described as being a processor such as a GPU, but in addition to this processor (referred to as a first processor), another separate processor (referred to as a second processor) such as a CPU that does not include commands for calculating the product of matrices having N rows and N columns may be included. In this case, the apparatus 1 may switch whether it calculates the product of the first integer and the second integer with the first processor or with the second processor, according to the sizes of the first integer and the second integer. For example, if the sizes of the first integer and the second integer are greater than a reference size (e.g. a size in a range from 8192 bits to 16384 bits), the apparatus 1 may calculate the product using the second processor. Instead, the apparatus 1 may calculate the product using the second processor if the sizes of the first integer and the second integer are less than the reference size. In this way, if the calculation speed is greater with the second processor than with the first processor, due to the sizes of the integers, it is possible to increase the speed of the calculation.

Furthermore, in the above description, the apparatus 1 calculates the product of the first integer and the second integer by multiplying together the plurality of first integer elements obtained by dividing the first integer and the plurality of second integer elements obtained by dividing the second integer, but may instead calculate the product using another technique. For example, the apparatus 1 may calculate the product of two integers (referred to as a third integer and a fourth integer) using the Karatsuba algorithm. As an example, the apparatus 1 may calculate a first product (Ch·Dh) by setting the higher half (Ch) of the third integer (C) as the first integer, setting the higher half (Dh) of the fourth integer (D) as the second integer, and calculating the product of the first integer and the second integer in the same manner as in the embodiment described above. Furthermore, the apparatus 1 may calculate a second product (Cl·Dl) by setting the lower half (Cl) of the third integer (C) as the first integer, setting the lower half (Dl) of the fourth integer (D) as the second integer, and calculating the product of the first integer and the second integer. The apparatus 1 may calculate a third product (Ch+Cl)·(Dh+Dl) by setting the sum (Ch+Cl) of the higher half and lower half of the third integer (C) as the first integer, setting the sum (Dh+Dl) of the higher half and lower half of the fourth integer (D) as the second integer, and calculating the product of the first integer and the second integer. The apparatus 1 may then calculate the third integer and the fourth integer based on the first product, the second product, and the third product. As an example, if the number of divisions is z, the apparatus 1 may calculate the product E of the third integer and the fourth integer using the expression $E=(Ch·Dh)z^2+\{(Ch+Cl)·(Dh+Dl)-(Ch·Dh)-(Cl·Dl)\}z+(Cl·Dl)$. In this way, it is possible to reduce the number of multiplications between integer elements and increase the calculation speed.

In the above description, the apparatus 1 includes the memory 2 and the integer product calculating section 9, but at least one of these components may be omitted from the apparatus 1. If the apparatus 1 does not include the memory 2, the matrix substituting section 3 may acquire the first integer data and the second integer data from outside the apparatus 1. If the apparatus 1 does not include the integer product calculating section 9, the integer product calculating section 9 may be connected outside of the apparatus 1, and the apparatus 1 may supply the partial products to the integer product calculating section 9.

The above describes one embodiment of the substitution of integer elements into the first matrix and the second matrix, but as long as it is possible to extract the partial products from the matrix elements of the third matrix and arrange these partial products at corresponding digit positions, another embodiment may be used. For example, the integer elements may be substituted into the first matrix and/or the second matrix in an order that is not continuous in the digit direction, or may be substituted in while changing the orders of the columns or rows. Furthermore, in the above description, the multiplicand in the matrix multiplication is the first matrix and the multiplier is the second matrix, but these roles may be reversed.

Figure 8:
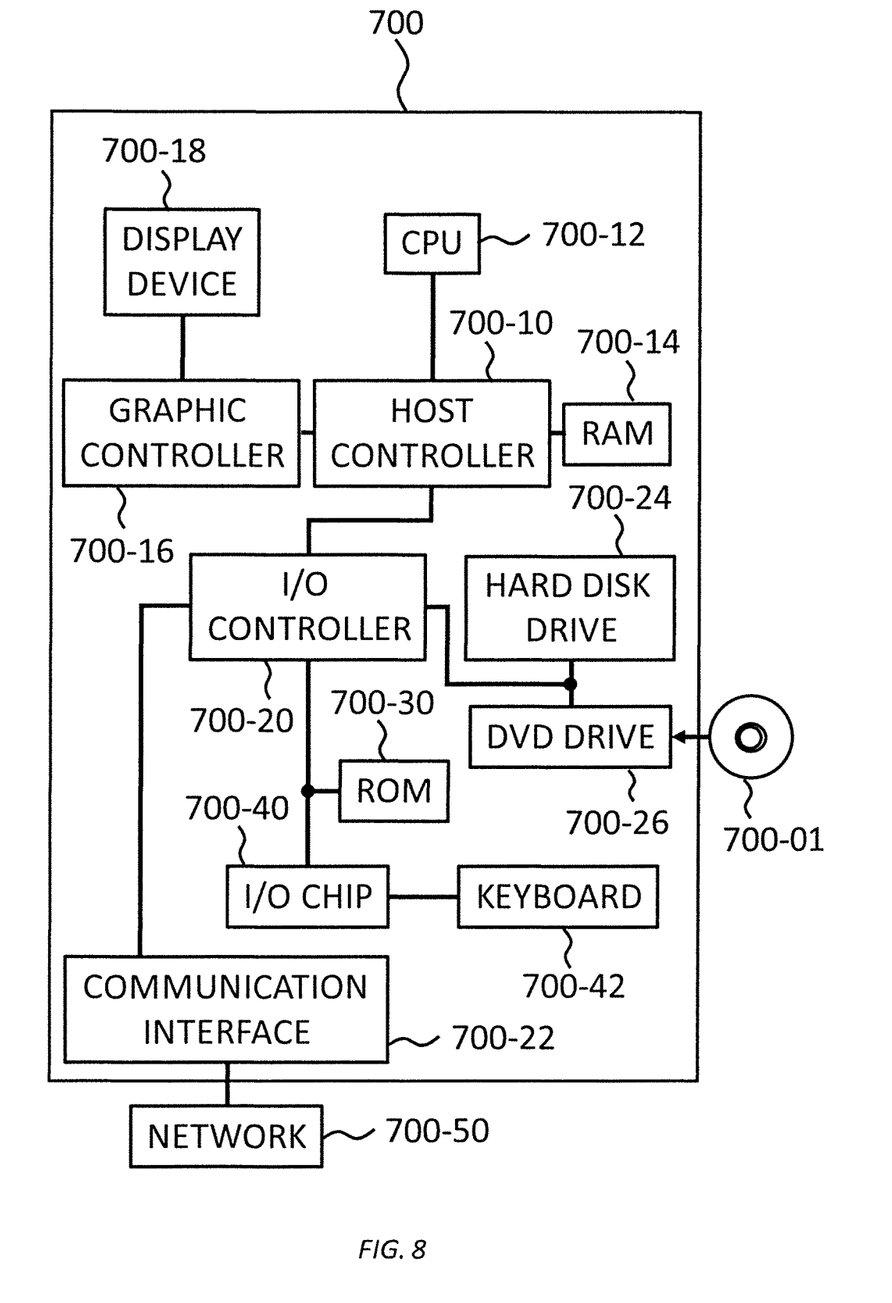
FIG. 8 shows an exemplary hardware configuration of a computer according to an embodiment of the invention.

FIG. 8 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD-ROM drive 700-26 and an IC card drive, which are connected to the host controller 700-10 via an input/output controller 700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18. The graphics controller 700-16 may include one or more GPU.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700.

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition. The database search based on the calculation precision and speed improves the performance of the computer 700 by reducing the number of clock cycles used by the CPU 700-12 to find the database result. This improvement of the computer 700 can be seen as a faster response to the database search.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, with the embodiments of the present invention, it is possible to increase the calculation precision and the calculation speed.

What is claimed is:

1. A computer-implemented method comprising:
increasing calculation speed of a computing device during processing operations by:
substituting N×N first integer elements, among a plurality of first integer elements obtained by dividing first integer data expressing a first integer in a first digit direction, into a first matrix;
substituting each of one or more second integer elements, among a plurality of second integer elements obtained by dividing second integer data expressing a second integer in a second digit direction, into at least one matrix element of a second matrix;
calculating a third matrix that is a product of the first matrix and the second matrix; and
outputting each matrix element of the third matrix in a calculation of a product of the first integer and the second integer.

2. The computer-implemented method according to claim 1, wherein during the substituting into the first matrix and the substituting into the second matrix, each matrix element of the first matrix and the second matrix is arranged such that each product corresponding to the same digit position in the product of the first integer and the second integer, among the product of each first integer element included in the first matrix and each second integer element included in the second matrix, corresponds to the same matrix element of the third matrix.

3. The computer-implemented method according to claim 1, wherein N×N first integer elements are continuous in the first digit direction in the first integer data.

4. The computer-implemented method according to claim 3, wherein the one or more second integer elements are continuous in the second digit direction in the second integer data.

5. The computer-implemented method according to claim 4, wherein during the substituting into the first matrix, N continuous first integer elements among N×N first integer elements are substituted into each row of the first matrix, in an ascending order or a descending order in the first digit direction in the first integer data; and
during the substituting into the second matrix, N continuous second integer elements among the plurality of second integer elements are substituted into each column of the second matrix, in an order that is opposite the order of the substituting of N first integer elements into the first matrix in the second digit direction of the second integer data.

6. The computer-implemented method according to claim 5, wherein
during the substituting into the first matrix, N×N first integer elements are substituted into each matrix element of the first matrix in a column-major and ascending or descending order; and
during the substituting into the second matrix:
N continuous second integer elements are substituted into a first row of the second matrix in an order that is the same as the order of the substituting of the N first integer elements into the first matrix; and
the N second integer elements are substituted into second and following rows of the second matrix while shifting the N second integer elements in the second integer data by one integer element at a time.

7. The computer-implemented method according to claim 6, wherein the third matrix is added to a fourth matrix; and
the outputting as the partial products includes:
extracting each matrix element in a first row or a final row of the fourth matrix, as a sum of the partial products of each first integer element and each second integer element at corresponding bit positions in the product of the first integer and the second integer; and
shifting rows other than the row extracted as the sum of the partial products in the fourth matrix one row toward the row that was extracted as the sum of the partial products, and setting each matrix element in a row having an empty space to 0.

8. The computer-implemented method according to claim 1, wherein a process of sequentially substituting the one or more second integer elements from the plurality of second integer elements one at a time into the second matrix during the substituting into the second matrix is repeated every time a different set of N×N first integer elements among the plurality of first integer elements is substituted into the first matrix during the substituting into the first matrix;
the calculating of the third matrix and the outputting of the partial products are performed every time the one or more second integer elements are substituted into the second matrix; and
the product of the first integer and the second integer is calculated based on each output partial product.

9. The computer-implemented method according to claim 8, wherein calculating the product of the first integer and the second integer includes:
arranging each partial product at a corresponding digit position in the product of the first integer and the second integer; and
adding digit overflow of each partial product to a higher digit.

10. The computer-implemented method according to claim 1, wherein a first product of a higher half of a third integer and a higher half of a fourth integer is calculated by setting the higher half of the third integer as the first integer, setting the higher half of the fourth integer as the second integer, and calculating the product of the first integer and the second integer;
a second product of a lower half of the third integer and a lower half of the fourth integer is calculated by setting the lower half of the third integer as the first integer, setting the lower half of the fourth integer as the second integer, and calculating the product of the first integer and the second integer;
a third product of a sum of the higher half and the lower half of the third integer and a sum of the higher half and the lower half of the fourth integer is calculated by setting the sum of the higher half and the lower half of the third integer as the first integer, setting the sum of the higher half and the lower half of the fourth integer as the second integer, and calculating the product of the first integer and the second integer; and
a product of the third integer and the fourth integer is calculated based on the first product, the second product, and the third product.

11. The computer-implemented method according to claim 1, wherein calculation of the third matrix is performed by a first processor that calculates a product of matrices having N rows and N columns according to one command.

12. The computer-implemented method according to claim 11, wherein switching is performed between calculating the product of the first integer and the second integer using the first processor and calculating the product of the first integer and the second integer using a second processor that does not have a command for calculating a product of matrices having N rows and N columns, according to sizes of the first integer and the second integer.

13. The computer-implemented method according to claim 1, wherein the plurality of first integer elements and the plurality of second integer elements have the same size.

14. The computer-implemented method according to claim 13, wherein the plurality of first integer elements and the plurality of second integer elements are each 8 bits.

15. An apparatus comprising:
a processor or programmable circuitry; and
one or more computer readable mediums collectively including instructions that, when executed by the processor or the programmable circuitry, cause the processor or the programmable circuitry to increase calculation speed of a computing device during processing operations by:
substituting N×N first integer elements, among a plurality of first integer elements obtained by dividing first integer data expressing a first integer in a first digit direction, into a first matrix;
substitute each of one or more second integer elements, among a plurality of second integer elements obtained by dividing second integer data expressing a second integer in a second digit direction, into at least one matrix element of a second matrix;
calculate a third matrix that is a product of the first matrix and the second matrix; and
output each matrix element of the third matrix as a partial product in a calculation of a product of the first integer and the second integer.

16. The apparatus according to claim 15, wherein during the substituting into the first matrix and the substituting into the second matrix, each matrix element of the first matrix and the second matrix is arranged such that each product corresponding to the same digit position in the product of the first integer and the second integer, among the product of each first integer element included in the first matrix and each second integer element included in the second matrix, corresponds to the same matrix element of the third matrix.

17. The apparatus according to claim 15, wherein the instructions, when executed by the processor or the programmable circuitry, cause the processor or the programmable circuitry to:
repeat a process of sequentially substituting the one or more second integer elements from the plurality of second integer elements one at a time into the second matrix during the substituting into the second matrix, every time a different set of first integer elements among the plurality of first integer elements is substituted into the first matrix during the substituting into the first matrix;
perform calculation of the third matrix and output of the partial products every time the one or more second integer elements are substituted into the second matrix; and
calculate the product of the first integer and the second integer based on each output partial product.

18. An apparatus comprising:
a processor device operably coupled to a memory; the processor configured to increase calculation speed of a computing device during processing operations by:
substituting, by a first matrix substituting section, N×N first integer elements, among a plurality of first integer elements obtained by dividing first integer data expressing a first integer in a first digit direction, into a first matrix;
substituting, by a second matrix substituting section, each of one or more second integer elements, among a plurality of second integer elements obtained by dividing second integer data expressing a second integer in a second digit direction, into at least one matrix element of a second matrix;
calculating, by a third matrix calculating section, a third matrix that is a product of the first matrix and the second matrix; and
outputting, by an output section, each matrix element of the third matrix as a product in a calculation of a product of the first integer and the second integer.

19. The apparatus according to claim 18, wherein during the substituting into the first matrix and the substituting into the second matrix, each matrix element of the first matrix and the second matrix is arranged such that each product corresponding to the same digit position in the product of the first integer and the second integer, among the product of each first integer element included in the first matrix and each second integer element included in the second matrix, corresponds to the same matrix element of the third matrix.

20. The apparatus according to claim 18, wherein the second matrix substituting section repeats a process of sequentially substituting the one or more second integer elements from the plurality of second integer elements one at a time into the second matrix during the substituting into the second matrix, every time the first matrix substituting section substitutes a different set of first integer elements among the plurality of first integer elements into the first matrix;
the third matrix calculating section and the partial product output section perform calculation of the third matrix and output of the partial products every time the one or more second integer elements are substituted into the second matrix by the second matrix substituting section; and
the apparatus comprises an integer product calculating section that calculates the product of the first integer and the second integer based on each output partial product.

21. A computer program product including one or more computer readable storage mediums collectively storing program instructions that are executable by a processor or programmable circuitry to cause the processor or the programmable circuitry to perform operations comprising:
increasing calculation speed of a computing device during processing operations by:
substituting N×N first integer elements, among a plurality of first integer elements obtained by dividing first integer data expressing a first integer in a first digit direction, into a first matrix;
substituting each of one or more second integer elements, among a plurality of second integer elements obtained by dividing second integer data expressing a second integer in a second digit direction, into at least one matrix element of a second matrix;
calculating a third matrix that is a product of the first matrix and the second matrix; and
outputting each matrix element of the third matrix as a product in a calculation of a product of the first integer and the second integer.

22. The computer program product according to claim 21, wherein during the substituting into the first matrix and the substituting into the second matrix, each matrix element of the first matrix and the second matrix is arranged such that each product corresponding to the same digit position in the product of the first integer and the second integer, among the product of each first integer element included in the first matrix and each second integer element included in the second matrix, corresponds to the same matrix element of the third matrix.

23. The computer program product according to claim 21, wherein the instructions, when executed by the processor or the programmable circuitry, cause the processor or the programmable circuitry to:

repeat a process of sequentially substituting the one or more second integer elements from the plurality of second integer elements one at a time into the second matrix during the substituting into the second matrix, every time a different set of N×N first integer elements among the plurality of first integer elements is substituted into the first matrix during the substituting into the first matrix;

perform calculation of the third matrix and output of the partial products every time the one or more second integer elements are substituted into the second matrix; and calculate the product of the first integer and the second integer based on each output partial product.

24. A computer-implemented method comprising:

increasing calculation speed of a computing device during processing operations by:

substituting N×N first integer elements, among a plurality of first integer elements obtained by dividing first integer data expressing a first integer in a first digit direction, into a first matrix;

substituting each of one or more second integer elements, among a plurality of second integer elements obtained by dividing second integer data expressing a second integer in a second digit direction, into at least one matrix element of a second matrix;

calculating a third matrix that is a product of the first matrix and the second matrix; and outputting each matrix element of the third matrix as a partial product in a calculation of a product of the first integer and the second integer.

25. The computer-implemented method according to claim 24, wherein during the substituting into the first matrix and the substituting into the second matrix, each matrix element of the first matrix and the second matrix is arranged such that each product corresponding to the same digit position in the product of the first integer and the second integer, among the product of each first integer element included in the first matrix and each second integer element included in the second matrix, corresponds to the same matrix element of the third matrix.

* * * * *